May 9, 1950            T. SUMAN            2,507,059

WIRE-CUTTING TOOL

Filed March 15, 1947            2 Sheets-Sheet 1

INVENTOR
THEODORE SUMAN
BY
*Toulmin & Toulmin*
ATTORNEYS

May 9, 1950          T. SUMAN          2,507,059
WIRE-CUTTING TOOL
Filed March 15, 1947          2 Sheets-Sheet 2
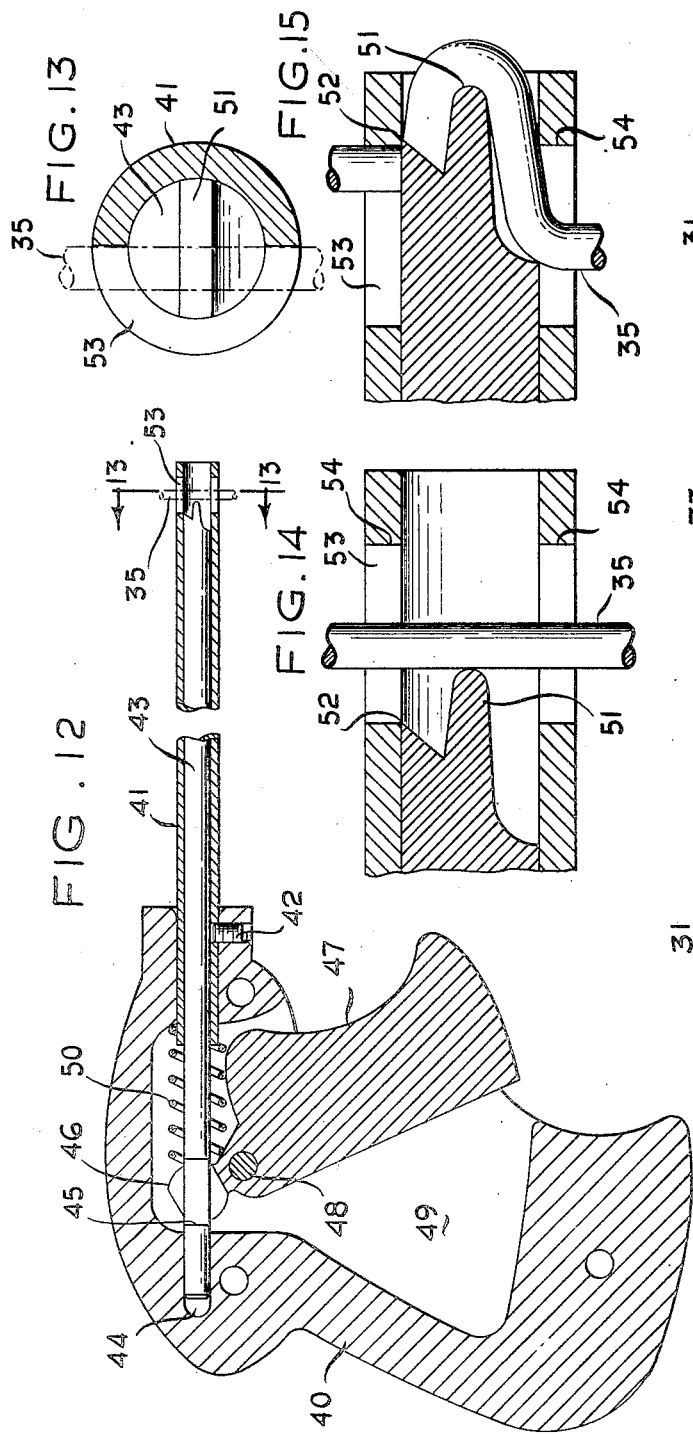
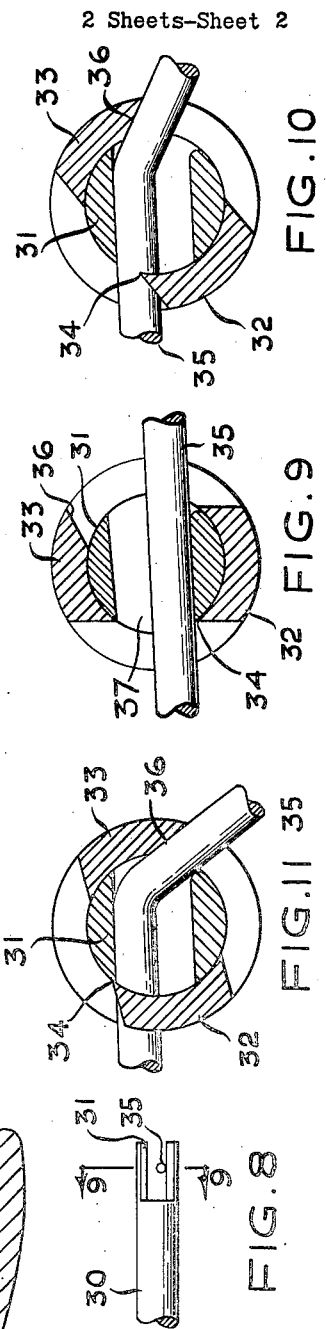
INVENTOR
THEODORE SUMAN
BY
Toulmin & Toulmin
ATTORNEYS Patented May 9, 1950

2,507,059

UNITED STATES PATENT OFFICE 2,507,059

WIRE-CUTTING TOOL

Theodore Suman, Dayton, Ohio, assignor of one-half to Norman W. Schmidt, Dayton, Ohio Application March 15, 1947, Serial No. 734,992

13 Claims. (Cl. 140—143)

The present invention relates to wire working tools and, more particularly, to tools for bending and cutting wires.

Numerous tools of this type have been made and marketed heretofore. However, practically all of these known tools have the drawback that their usefulness is restricted to places which are easily accessible, while they cannot be used at places which, in view of a close assembly of parts, do not allow the introduction of insertion of the heretofore known and relatively bulky cutting tools.

Therefore, it is an object of this invention to provide a cutting tool which will allow the cutting of wires at places which are not accessible to pliers and similar cutting tools heretofore used.

It is another object of the invention to provide a cutting tool in which the cutting elements are of tubular shape and can be actuated wherever it is possible to insert a tube of a diameter corresponding to the diameter of said tubular cutting elements.

Still another object is to provide a cutting tool in which the length of the tool will not affect the size of the handle nor the size of the cutting elements of said tool.

A still further object of the invention consists in the provision of a cutting tool of the above mentioned type which may also be used for bending the wire without cutting the same.

These and other objects and advantages of the invention will appear more clearly from the following description in connection with the accompanying drawings in which:

Figure 8 illustrates the cutting and bending end of a modified form of the invention;

Figure 9 is an enlarged section on line 9—9 of Figure 8 and illustrates the first step in cutting and bending the wire.

Figure 10 is a section similar to Figure 9 and illustrates a further step in cutting and bending the wire;

Figure 11 is a section similar to Figure 9 and illustrates the final step in cutting and bending the wire.

Figure 12 is a section through another modified form of the invention.

Figure 13 is a section on line 13—13 of Figure 12.

Figure 14 is an enlarged section of the cutting end of the tool of Figure 12 and illustrates the first step of cutting and bending.

Figure 15 is a view similar to Figure 14 and illustrates the final step in cutting and bending the wire.

General outline

Figure 1:
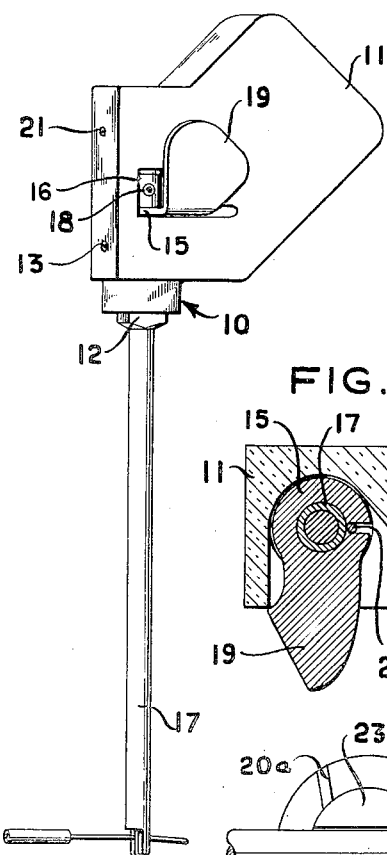
Figure 1 is a perspective view of a tool according to the invention shown in a position to cut a wire.
Figure 3:
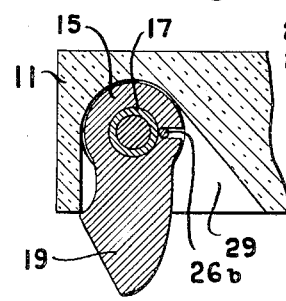
Figure 3 is a section along the line 3—3 of Figure 2.
Figures 2, 4:
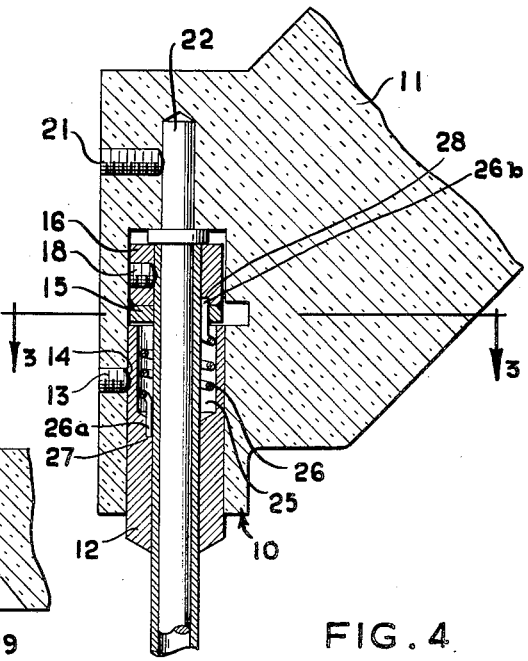
Figure 2 is a longitudinal section through the cutting tool of Figure 1, but on a slightly larger scale than the latter.
Figure 4 represents a view of the cutting head of the tool.

The cutting tool according to the invention consists primarily of a tube having one end mounted in a handle while the other end of the tube is provided with a tongue-like cutting blade. Arranged in said tube is a rod or tubular member likewise provided with a cutting blade for cooperation with the cutting blade of the tube. The arrangement is such that, in order to effect the cutting operation, an actuating lever at the handle is operated so as to cause a partial rotation either of the tube or of the rod or tubular member, thereby bringing about relative movement of the cutting blades with regard to each other.

Preferably, the end of the rod or tubular member is fork-shaped to receive and guide a wire so that the rotative movement of the rod or tubular member without rotation thereof relative to the tube will cause the wire in said fork-shaped end to bend.

According to another embodiment of the invention, the cutting tool comprises a tube with a notch adjacent the free end thereof. In this tube is reciprocably mounted a cutting element having its free end recessed and arranged so that when reciprocating the cutting element in said tube the recessed portion will in cooperation with the notched part of the tube cut a wire placed in said notch in such a manner that one end of the wire will be cut straight while the other end of the wire will be bent simultaneously with the cutting operation. The cutting element is preferably reciprocated from a handle which holds the tube.

Structural arrangement

Referring now to the drawings in detail, the structure shown therein represents a cutting tool for cutting wire. This tool, which is generally designated 10, comprises a handle 11 in which is mounted a bushing 12. The bushing 12 is held stationary in the handle 11 by means of a set screw 13 which preferably enters a corresponding recess 14 in the bushing 12. Likewise arranged in the handle 11 in alignment with the bushing 12 is a disc 15 having welded thereto a ring 16. Mounted within the bushing 12 and the disc 15 and ring 16 is a tubular member 17. The tubular member 17 is rotatably mounted and has connected thereto by means of the set screw 18 the ring 16 and disc 15 so that rotation of the ring 16 will cause rotation of the tubular member 17. In order to facilitate rotation of the ring 16, the latter has connected thereto an operating lever 19 which forms a part of the disc 15. The outer end of the tubular member has connected thereto a tongue 20 which forms one cutting element and preferably is shaped so that it slightly tapers towards the outer end. This slight taper, which is indicated by the reference numerals 20a and 20b, will facilitate the cutting operation inasmuch as it will provide a slicing effect.

Stationarily mounted in the handle 11 by means of a set screw 21 is a rod 22 which extends through the tubular member 17 and is provided at its outer end with two prongs 23 and 24 of which one prong in this instance forms the second cutting element cooperating with the cutting element 20 of the tubular member 17.

Figure 6:
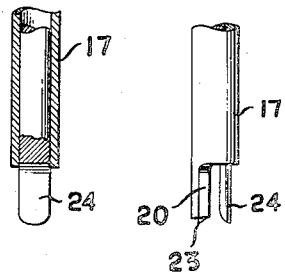
Figure 6 is a view similar to that of Figure 5 showing a wire as it is gripped by the cutting elements of the cutting head.
Figure 7:
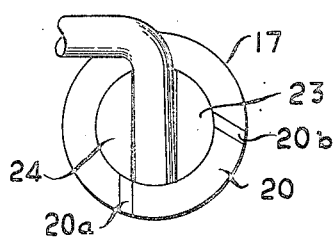
Figure 7 illustrates the bending of a wire with the tool head.
Figure 5:
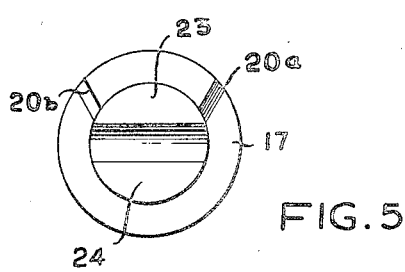
Figure 5 is an enlarged front view of the cutting elements shown in Figures 1 and 2.

The bushing 12 is provided with a bore 25 in which is mounted a spring 26. One end 26a of the spring 26 engages a recess 27 in the bushing, while the other end 26b of the spring 26 extends into a corresponding recess 28 provided in the disc 15 and ring 16. The spring 26 before being inserted into the bore 25, is given a twist so that it continuously urges the lever 19 into upward position in which the cutting element 20 substantially registers with the prong 23 so that the tool occupies its non-cutting position. In this position a wire can be passed through or can be gripped by the prongs 23 and 24 and if desired, can be bent by a slight turn of the handle 11. If it is desired to cut the wire between the prongs 23 and 24, it is merely necessary to press the lever 19 downwardly so that the tongue 20 of the tubular member 17 will move in clockwise direction with regard to Figure 6 while the cutting element 24 remains stationary, thus cutting the wire as will be clear from Figure 6.

As will be obvious from the foregoing description, the tool illustrated in the drawing can be provided with a tubular member 17 and rod 22 of any desired length without in any way increasing the size of the cutting elements 20 and 24 and without increasing the size of the handle 11 and lever 19. Thus, the tool according to the present invention makes it possible to bend and to cut wires which are closely surrounded by other elements as may for instance be the case in radio and television sets and similar devices where it would be impossible to use other cutting tools such as pliers. On the other hand, the tool according to the invention can easily be operated with one hand which grips the handle 11 while the thumb of the same hand actuates the lever 19.

It is of course understood that in order to be able to actuate the lever 19, the handle 11 is provided with a recess 29 to allow freedom of movement to the handle 19. As will also be clear from the drawing, the tool is extremely simple in construction and can easily be assembled and disassembled if for some reason an element is to be replaced or a sharpening of the cutting elements is desired.

In the form of the invention shown in Figures 8 through 11, the cutting and bending is accomplished by a single rotative movement of the tubular member 30. The member 30 is rotated with respect to the rod 31 by the handle 19 of Figure 1 and since the entire construction of the gripping member 11 and handle 19 is exactly the same as that of Figure 1, it has been omitted from Figure 8. As shown in Figure 9 the member 30 has formed on the end thereof the prongs 32 and 33. The sharpened edge 34 of prong 32 is used to shear the wire, shown at 35. The flat portion 36 on prong 33, is for the purpose of bending the wire at the same time that the shearing edge 34 is cutting. This operation will be apparent by reference to Figure 9 which shows wire 35 lying through the slot 37 of the stationary member 31. Upon rotation of handle 19, shearing edge 34 will cut through the wire 35 as said wire is supported by slot 37. The flat portion 36 will bend the wire at the same time, as illustrated in Figure 10. Figure 11 shows complete rotation of the member 30 and the shearing and bending operation completed.

Figures 12 through 15 illustrate another construction of the invention, and, in referring to Figure 12 in particular, it will be seen to comprise a pistol grip portion 40 in which is stationarily mounted a sleeve 41 held against movement by the set screw 42. Slidably mounted within the sleeve 41 is a shearing plunger 43 the end of which is slidably supported in bore 44 of the handle or grip 40. A slot 45 formed on the plunger 43 receives the slotted ball head 46 of lever or trigger 47 mounted for rotation on pin 48. The lever 47 is mounted within the slotted portion 49 on handle 40 and is urged to the position shown by spring 50. At the other extreme end of the plunger 43 there is formed the bending portion 51 and the shearing edge 52. A semi-circular slot 53 is formed near the end of the sleeve 41 and it is this slot which is hooked over the wire to be cut and bent, as shown by the dotted position of the wire 35 in Figures 12 and 13. It will be apparent that, as the lever or trigger 47 is squeezed to the left as seen in Figure 12, the ball head 46 will move the plunger 43 to the right against the action of spring 50. This action moves wire 35 from the position shown in Figure 14 to the position of Figure 15, thereby binding the wire against the edge 54 of slot 53. Continued movement of plunger 43 shears or cuts the wire with the edge 52 and also bends the wire with the portion 51 as shown in Figure 15.

It will be apparent from the above description that a novel and easily handled tool has been provided for cutting wire and producing an identifying bend in the cut end thereof.

It is further understood that the present invention is by no means limited to the particular structures and arrangements shown in the accompanying drawings, but also includes any modifications within the scope of the appended claims.

Having thus fully described my invention, what I claim as new and desire to secure by Letters Patent, is:

1. A cutting tool comprising in combination, a handle, a relatively long and narrow tubular member rotatably secured to said handle, lever means connected to one end of said tubular member and operable manually for selectively effecting rotation of said tubular member, a first cutting element associated with the other end of said tubular member, rod means extending through said tubular member and having one end rigidly connected to said handle, a second cutting element connected to the other end of said rod means, and yielding means mounted in said handle and continuously urging said lever means into a predetermined position corresponding to the non-cutting position of said tool.

2. A cutting tool comprising in combination, a handle, a rod stationarily secured to said handle and provided with two prongs at its outer end, at least one of said prongs constituting a first cutting element, a relatively long and narrow tubular member surrounding said rod and concentrically arranged relative thereto, said tubular member being provided with a second cutting element arranged for cooperation with said first cutting element and adapted when moved relative thereto to effect a cutting operation with said first cutting element, and manually operable means connected to said tubular member and operable selectively from said handle for effecting movement of said tubular member to thereby bring about a cutting operation, said prongs being adapted to receive a wire therebetween and being rotatable by said handle for bending said wire.

3. A cutting tool comprising in combination, a tubular member having a cut-out portion adjacent one end thereof for receiving a wire to be cut, a cutting member reciprocably mounted in said tubular member and provided with recessed portions forming a cutting edge and an extension with a rounded outer end extending beyond said cutting edge, and means for effecting a reciprocative movement between said tubular member and said cutting member.

4. A cutting tool comprising in combination, a handle, a tubular member connected to said handle, said tubular member being provided with a cut-out portion adjacent the free end thereof for receiving a portion of a wire, a cutting element reciprocable in said tubular member and provided with cutting and bending means spaced from each other and arranged adjacent the outer end thereof, said cutting and bending means being arranged for cooperation with said cut-out portion of said tubular member, and manually operable means operatively connected with said reciprocable element for bringing said cutting and bending means into cooperation with said cut-out portion.

5. A cutting tool comprising in combination, a handle, a tubular member connected to said handle, said tubular member being provided with a cut-out portion adjacent the free end thereof for receiving a portion of a wire, a reciprocable cutting element movable in said tubular member and provided with cutting and bending means spaced from each other and arranged adjacent the outer end thereof, said cutting and bending means being arranged for cooperation with said cut-out portion of said tubular member, yielding means continuously urging said cutting and bending means away from said cut-out portion, and manually operable means associated with said handle for selectively bringing said cutting and bending means into cooperation with said cut-out portion.

6. A cutting tool comprising in combination, a tubular member having a cut-out portion adjacent one end thereof, a reciprocable cutting element having a finger with a rounded outer end and a curved recess at one side of said finger and a shorter groove-like recess with a cutting edge on the other side of said finger, means for reciprocating said cutting element relative to said tubular member for moving said cutting edge past said cut-out portion, and means for preventing rotative movement of said cutting element to said tubular member during the reciprocation of said cutting element.

7. A cutting tool comprising in combination, a long and narrow tubular member, a cutting member movable relative to said tubular member and having an extension passing through said tubular member, cutting and bending means arranged adjacent the end of said tubular member and said cutting member and adapted in response to relative movement between said tubular member and said cutting member simultaneously to cut a wire straight at one end and bending it at the other end, and manually operable means connected to said extension and operable selectively for effecting relative movement between said cutting member and said tubular member.

8. A cutting tool comprising in combination, a tubular member, a cutting member rotatable relative to said tubular member, cutting and bending means associated with said cutting member and said tubular member and adapted in cooperation with each other to cut and bend a wire simultaneously upon operation of said cutting member, and manually operable means for effecting rotative movement of said cutting member relative to said tubular member.

9. A cutting and bending tool comprising in combination, a handle, a relatively long and narrow tubular member having a cutting element associated with one end thereof while the other end of said tubular member is rotatably mounted in said handle, manually operable means associated with said handle and operable selectively to effect a partial rotation of said tubular member, and rod means having one end thereof stationarily mounted within said handle and extending through said tubular member, while the other end of said rod means is provided with prongs one of which has a cutting edge for cooperation with the said cutting element.

10. A cutting tool comprising in combination, a handle, a wire receiving element stationarily secured to said handle and having two prongs for receiving a wire therebetween, one of said prongs having a cutting edge, a wire shaping element concentrically arranged with regard to said wire receiving element for cooperation therewith, said wire shaping element being rotatably secured to said handle and having a recess for passing a wire therethrough, one of the wall portions defining said recess having a cutting edge for cooperation with said first mentioned cutting edge, while another wall portion defining said recess is so arranged as to reduce the free passage of the wire to be cut between said prongs when the cutting edge of said wire shaping element is in its cutting position, thereby causing said wire shaping element in its cutting position simultaneously to cut and bend said wire, and lever means operable manually and selectively and secured to said wire shaping element for movement thereof relative to said wire receiving element.

11. A cutting tool comprising in combination, a handle, a wire receiving element stationarily secured to said handle and having two prongs for receiving a wire therebetween, one of said prongs having a cutting edge, a wire shaping element concentrically arranged with regard to said wire receiving element for cooperation therewith, said wire shaping element being rotatably secured to said handle and having a recess for passing a wire therethrough, one of the wall portions defining said recess having a cutting edge for cooperation with said first mentioned cutting edge, while another wall portion defining said recess is so arranged as to reduce the free passage of the wire to be cut between said prongs when the cutting edge of said wire shaping element is in its cutting position, thereby causing said wire shaping element in its cutting position simultaneously to cut and bend said wire, lever means operable manually and selectively and secured to said wire shaping element for movement thereof relative to said wire receiving element, and yielding means continuously urging said wire shaping element into non-cutting position.

12. A cutting tool comprising in combination, a first element, a second element, one of said elements being provided with a cutting edge and a bending punch, while the other element is provided with a recess to receive and hold a wire, and means operatively connected with one of said elements and operable manually for selectively effecting relative movement between said elements to cut a wire so as to cut one end straight while simultaneously bending the other end.

13. A cutting tool comprising in combination, a first element having both a cutting portion and a bending portion, a second element having a wire receiving and supporting portion, and manually operable means associated with one of said elements and operable selectively to bring about a relative movement between said first and second elements to cut a wire placed therebetween so as to cause said cutting portion to cut one wire end straight while simultaneously causing said bending portion to bend the other end of said wire.

THEODORE SUMAN.

REFERENCES CITED

The following references are of record in the file of this patent:

UNITED STATES PATENTS

| Number | Name | Date |
|---|---|---|
| 938,044 | Graybill | July 13, 1909 |
| 1,190,075 | Ambrose | July 4, 1916 |
| 1,336,605 | Becker | Apr. 13, 1920 |
| 1,705,819 | Kruse | Mar. 19, 1929 |
| 1,708,730 | Kruse | Apr. 9, 1929 |
| 1,976,686 | Wunderlich | Oct. 9, 1934 |
| 2,030,764 | Poole | Feb. 11, 1936 |